Patented Jan. 10, 1939

2,143,358

UNITED STATES PATENT OFFICE 2,143,358

LACTIC ACID FERMENTATION PROCESS

James F. Walsh and Haskell C. Needle, Chicago, Ill., assignors to American Maize-Products Company, a corporation of Maine No Drawing. Application July 27, 1937, Serial No. 155,925

11 Claims. (Cl. 195—48)

Our invention relates to the production of lactic acid from carbohydrate materials by fermentation processes and more particularly to the successful use therein of an assimilable milk protein as the nutrient for a Lactobacillus fermenting agent that effects fermentation of the carbohydrate to form lactic acid.

Lactobacilli fermenting agents, such as for example, *Lactobacillus delbruckii*, will ferment carbohydrate materials particularly the well-known sugars such as dextrose, levulose, maltose, sucrose and also dextrin, but the rate of fermentation and the color of the resulting product vary widely. These variations depend largely upon the type of assimilable material used as the nutrient or food media for the fermenting Lactobacilli. Heretofore various media, containing proteins, salts and carbohydrates in an assimilable form have been employed, but their commercial use has been characterized by certain disadvantages, such as extended fermentation time, undesirable color in the final product, etc. In general, the fermentation time required in the prior art processes is from ten to fifteen days, the assimilable material being slowly used up with the production of lactic acid. Also, with some of the proteins heretofore used acid-hydrolysis has been necessary to increase their assimilability, and fermentation with such media gives rise to undesirable color in the final product. This necessitates treating the product with strong decolorizing agents or with large amounts of filtering agents such as activated char. These necessary refining steps involve appreciable expense.

An object of our invention is to provide an improved process for the production of lactic acid by the fermentation of carbohydrates which process has a relatively fast fermentation rate, will not produce undesirable colors in the final product, and employs an efficient inexpensive protein material as the assimilable medium for the bacilli.

We have discovered that lactic acid may be produced with great efficiency by proper fermentation of a suitable carbohydrate material using non-denatured milk as the assimilable medium or nutrient for the bacilli. In its broad aspects our invention comprises fermenting carbohydrate material with a suitable Lactobacillus in the presence of non-denatured milk proteins. The lactic acid produced by this process has acceptable purity, no undesired color and is relatively inexpensive.

There are various reports in the literature of attempts to use milk as a medium for lactic acid fermentation of carbohydrates but they all conclude that milk is of no value for this purpose. This is specifically stated by the well-known authority Bergey in his "Manual of Determinative Bacteriology".

Our investigations indicate that the difficulties experienced by the previous investigators were due principally to the fact that the milk employed by them had been given a heat sterilization of such a nature as to denaturize largely the protein content and thereby render it of no substantial value as an assimilable material for bacilli. In the production of lactic acid according to our invention, one of the most important features is that the protein content of the milk should not be denatured.

According to our invention, non-denatured milk is employed as the assimilable material. This milk may be of the whole, butter or skim milk type and may be used in either liquid form, which may be pasteurized, or as dry milk powder. The dry milk powders obtainable on the market may be used satisfactorily for this purpose. These powders are ordinarily produced by a flash drying operation such as spray drying or drum drying which takes places so rapidly that the proteins are not denatured. The Lactobacilli suitable for use as fermenting agents in this invention include *Lactobacillus delbruckii* and *leichmanni* and variants thereof. These bacilli will effect fermentation of carbohydrates at a relatively high temperature, e. g. 120° F., which is sufficient to incapacitate any contaminating bacteria that may be present. For this reason these bacilli are of particular value in the present invention. If the contaminating bacteria were permitted to grow and function in our process the desired pure, colorless lactic acid would not be produced.

In the prior art processes various protein nutrients other than milk have been used, for example, molasses, corn germ meal cake, peptones, glue, and various soluble nitrogen compounds, such as hexamethylene tetramine, urea, asparagine. These nutrients introduce undesired soluble substances into the fermented liquors. They also give rise to rapid color development in the warm fermentation liquors, which colors can not be removed economically. The speed of fermentation with these nutrients is relatively slow and consequently butyric acid fermentation and other contaminating fermentations proceed to a considerable extent. This prolonged fermentation at a temperature of about 120° F. also results in caramelization of the sugars giving the fermented liquors an undesirable dark color. In view of the various contaminations thus arising it has been the practice heretofore to crystallize calcium lactate out of the fermentation liquors in order to secure therefrom a pure colorless lactic acid.

In accordance with our invention, in which non-denatured milk is used as the nutrient, all of the above mentioned disadvantages and limitations have been minimized, and we have prepared a pure colorless lactic acid directly from the calcium lactate fermentation liquor without crystallizing.

According to one specific but non-limiting example of our invention the carbohydrates, such as dextrose produced from acid converted starch, or starch solubilized by enzymotic treatment, and the assimilable milk may be used in the form and proportions of, one pound of skimmed milk powder for each 100 gallons of the sugar solution containing from 8% to 12% of fermentable carbohydrate. The latter may be supplied as so-called "70" sugar. These proportions are not critical and may vary from as little as about 5 ounces of milk per 100 gallons of the sugar solution up to about 10 pounds or more of milk per 100 gallons of sugar solution. A range that we have found to be particularly advantageous is from about 3/4 pound up to about 5 pounds of milk per 100 gallons of sugar solution. In general, if the highest rate of fermentation is desired the amount of milk employed should be the above given maximum.

The fermentation of the carbohydrate material, e. g. dextrose syrup, by the lactic acid bacillus, e. g. *Lactobacillus delbruckii*, in the presence of the milk and a carbonate is carried on in any suitable type of container at a temperature of about 120° F. This temperature has no adverse or coagulating effect on the proteins present. We have found that when using this temperature and the above mentioned advantageous range of proportions, the fermentation proceeds at a relatively fast rate, so that at the end of about six or seven days the dextrose content of the fermented solution has dropped to a very low figure, usually less than one-tenth of 1% and all of the sugars have been fermented to lactic acid. This acid, as formed, is converted by the calcium carbonate into calcium lactate.

In carrying out the fermentation step, described just above, we have found that the fermentation temperature can be advantageously maintained by the slow percolation of warm moist air bubbles throughout the slowly agitated solution. It is advisable that the air used for this purpose be saturated or largely saturated with water vapor. By using this process the fermenting batch is given intimate contact with innumerable heating surfaces, obtaining optimum heating conditions. By using air which is largely saturated with water vapor more efficient heat conduction can be accomplished and at the same time evaporation of the liquor being fermented is prevented. This method of conducting the fermentation gives particularly uniform results and a particularly pure product.

The fermented calcium lactate solution is next heated to the death point, i. e., approximately 180° F., to kill active bacteria. After a period of time sufficient to kill all living organisms, as for example one hour, the fermentation liquor is treated with calcium hydroxide to precipitate heavy metals and proteins, and then the solution is filtered. We have found it advantageous to add sufficient calcium hydroxide to give the solution a pH value of between 10 and 12 and preferably in the order of 11. The filtrate, which is a slightly yellowish calcium lactate liquor is decolorized with vegetable carbon and filtered.

The desired lactic acid is obtained from the filtered calcium lactate solution by treating with sulphuric acid and filtering to remove the precipitated calcium sulphate. The filtrate is then treated with vegetable carbon, and after filtration the resulting clear lactic acid is evaporated to the desired acid strength.

Various modifications and changes may be made in the materials and processes described hereinbefore without departing from the scope of our invention. The appended claims are addressed to some of the novel features of this invention.

We claim:

1. A process for producing lactic acid comprising fermenting a converted starch liquor containing substantial amounts of dextrose with *Lactobacillus delbruckii* and using non-denatured milk as the assimilable nutrient for said bacillus.

2. A process for producing lactic acid comprising fermenting a sugar solution at a temperature of approximately 120° F. in the presence of a *Lactobacillus leichmanni* and using non-denatured milk as the assimilable nutrient for the bacillus.

3. In a process for producing lactic acid by fermenting a sugar solution with a lactic acid producing Lactobacillus, the step of using a non-denatured milk powder as the assimilable nutrient for the bacillus.

4. In a process for producing lactic acid by fermenting a sugar solution with a lactic acid producing Lactobacillus, the improvement comprising using non-denatured milk as the assimilable nutrient for the bacillus and maintaining the fermentation temperature during the fermenting process by effecting a relatively slow percolation of warm, moist air bubbles throughout the fermenting mass.

5. In a process for producing lactic acid by fermenting a sugar solution at a temperature of approximately 120° F. in the presence of a lactic acid producing Lactobacillus operable at said temperature, the steps of using non-denatured milk as the assimilable nutrient for the bacillus, and subsequently heating to approximately 180° F. to destroy living bacteria.

6. In a process for producing lactic acid by fermenting a converted starch solution containing susbtantial amounts of dextrose with a lactic acid producing Lactobacillus, the step of using as the assimilable nutrient for the bacillus non-denatured milk in the proportion of about five ounces to ten pounds of milk to each one hundred gallons of solution.

7. In a process for producing lactic acid by fermenting a sugar solution with a lactic acid producing Lactobacillus, the step of using as the assimilable nutrient for the bacillus non-denatured skimmed milk powder.

8. In a process for producing lactic acid by fermenting a converted starch solution with a lactic acid producing Lactobacillus the step of using as the assimilable nutrient for the bacillus non-denatured milk in the amount of approximately three-quarters of a pound to about five pounds of milk per one hundred gallons of the converted starch solution.

9. In a process for producing lactic acid by fermenting a sugar solution in the presence of a lactic acid producing Lactobacillus and calcium carbonate to form calcium lactate, the steps of using non-denatured milk as the assimilable nutrient for said bacillus, treating the fermented liquor with calcium hydroxide, then filtering to remove the precipitated metals and proteins, and treating the calcium lactate liquors to obtain the lactic acid therefrom.

10. In a process for producing lactic acid from a sugar solution by fermenting said solution with a lactic acid producing Lactobacillus, the improvement of using non-denatured milk as the assimilable nutrient for said bacillus.

11. A process of producing lactic acid by fermentation of a sugar solution characterized by fermenting said solution with a lactic acid producing Lactobacillus of the class consisting of *Lactobacillus delbruckii* and *Lactobacillus leichmanni*, and using non-denatured milk as the assimilable nutrient for said bacillus.

JAMES F. WALSH.
HASKELL C. NEEDLE.